(No Model.)

S. BRADLEY.
LIGHTNING ROD COUPLING.

No. 305,140. Patented Sept. 16, 1884.

WITNESSES:
Fred G. Dieterich
Wm. H. Melchoir

INVENTOR.
Sylvester Bradley
By DeWitt C. Allen
ATTORNEY

UNITED STATES PATENT OFFICE.

SYLVESTER BRADLEY, OF BLOOMINGTON, ILLINOIS.

LIGHTNING-ROD COUPLING.

SPECIFICATION forming part of Letters Patent No. 305,140, dated September 16, 1884.

Application filed May 7, 1883. (No model.)

*To all whom it may concern:*

Be it known that I, SYLVESTER BRADLEY, of Bloomington, in the county of McLean, and in the State of Illinois, have invented certain new and useful Improvements in Lightning-Rod Couplings; and I do hereby declare that the following is a full, clear, and exact description thereof, reference being had to the accompanying drawings, and to the letters of reference marked thereon, making a part of this specification, and in which—

Figure 1:
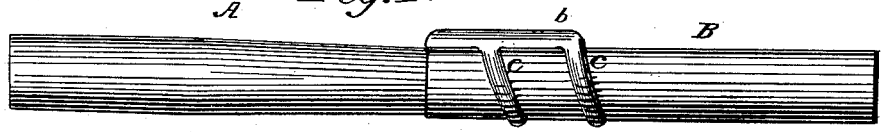
Figure 2:
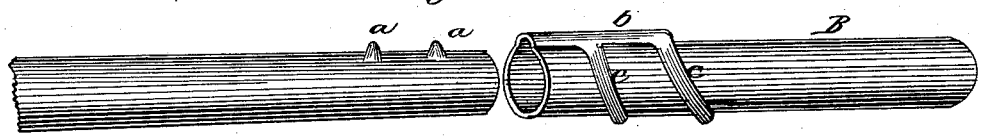
Figure 3:
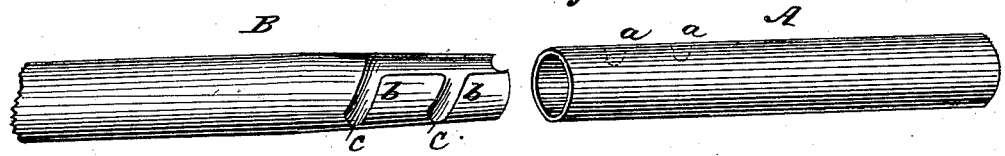

Figure 1 represents the two sections of a lightning-rod when coupled together. Fig. 2 represents the two sections when disconnected from each other; Fig. 3, a similar view of a slight modification of the same.

This invention relates to certain new and useful improvements in lightning-rod coupling-joints, and more particularly to the class of tubular lightning-rods; and the invention consists in novel features of construction and combination of parts, all as will be hereinafter described, and set forth in the claims hereto annexed.

In the drawings, A and B represent two sections of a lightning-rod, the section A made tapering toward one end, as shown in Fig. 2, and provided with one or more raised knobs or projections, $a$. The section B is provided with a longitudinal groove, $b$, corresponding to the length of the tapering portion of section A, and said groove $b$ has leading from it one or more lateral inclined extension-grooves, $c$, partially surrounding the section B. In coupling the sections together to form a joint, the tapering end of section A is forced as far as possible into the section B, the knobs or projections $a$ entering the groove $b$, so that when section A is turned to the right the knobs or projections $a$ will enter the grooves $c$ and pass down the same until they reach the bottom of said grooves, thus coupling and securely locking the parts together.

In Fig. 3 is shown a slight modification, the section B being made tapering at one end and the groove $b$ and lateral inclined extension-grooves $c$ depressed, while the section A has its knobs or projections $a$ also depressed. This construction, working upon the same principle as the construction shown in Figs. 1 and 2, need not be further described, although the construction shown in Figs. 1 and 2 is deemed more preferable.

My improved coupling and joint combines simplicity, cheapness, and durability in construction, and which can be easily and readily connected together, while the tapering form of one section acts upon the principle of a wedge, which greatly assists in securely locking the sections together.

Having thus fully described my invention, what I claim as new, and desire to secure by Letters Patent, is—

1. In a coupling-joint for tubular lightning-rods, the combination of two sections, one section thereof having one or more knobs or projections, $a$, and the other section having a tapering end with a longitudinal groove, and one or more lateral inclined grooves leading therefrom and partially surrounding said section, substantially as and for the purpose herein shown and described.

2. A coupling-joint for lightning-rods, composed of the section A, having one or more raised knobs or projections, $a$, and a tapering end, and the section B, having a longitudinal groove, $b$, with one or more lateral extension-grooves, $c$, leading therefrom and partially surrounding the section, substantially as herein shown and described.

In testimony that I claim the foregoing I have hereunto set my hand this 19th day of March, 1883.

SYLVESTER BRADLEY.

Witnesses:
THOS. SLADE,
IRVING UNDERHILL.